United States Patent
Ray et al.

[11] Patent Number: 5,843,209
[45] Date of Patent: Dec. 1, 1998

[54] VAPOR PERMEATION SYSTEM

[75] Inventors: Roderick J. Ray; David D. Newbold; Dwayne T. Friesen; Scott B. McCray, all of Bend, Oreg.

[73] Assignee: Bend Research, Inc., Bend, Oreg.

[21] Appl. No.: 910,409

[22] Filed: Aug. 13, 1997

[51] Int. Cl.⁶ .................................................. B01D 53/22
[52] U.S. Cl. .................................................. 95/52; 95/45
[58] Field of Search ............................ 95/45, 47–55

[56] References Cited

U.S. PATENT DOCUMENTS

| | | | |
|---|---|---|---|
| 3,735,558 | 5/1973 | Skarstrom et al. | 95/51 |
| 3,735,559 | 5/1973 | Salemme | 95/52 |
| 4,844,719 | 7/1989 | Toyomoto et al. | 95/52 |
| 4,857,081 | 8/1989 | Taylor | 95/52 |
| 4,952,219 | 8/1990 | DiMartino, Sr. | 95/51 |
| 4,961,759 | 10/1990 | Taylor | 95/52 |
| 4,978,430 | 12/1990 | Nakagawa et al. | 203/14 |
| 5,002,590 | 3/1991 | Friesen et al. | 95/52 |
| 5,004,482 | 4/1991 | Haas et al. | 95/52 |
| 5,067,971 | 11/1991 | Bikson et al. | 95/52 |
| 5,084,073 | 1/1992 | Prasad | 95/52 |
| 5,116,396 | 5/1992 | Prasad et al. | 95/51 X |
| 5,169,412 | 12/1992 | Prasad et al. | 95/54 X |
| 5,205,842 | 4/1993 | Prasad | 95/47 |
| 5,226,932 | 7/1993 | Prasad | 95/52 |
| 5,236,474 | 8/1993 | Schofield et al. | 95/47 |
| 5,332,424 | 7/1994 | Rao et al. | 95/47 |
| 5,354,547 | 10/1994 | Rao et al. | 95/50 X |
| 5,435,836 | 7/1995 | Anand et al. | 95/50 X |
| 5,455,016 | 10/1995 | Choe et al. | 95/47 X |
| 5,507,856 | 4/1996 | Rao et al. | 95/50 |
| 5,611,842 | 3/1997 | Friesen et al. | 95/45 X |

FOREIGN PATENT DOCUMENTS

| | | | |
|---|---|---|---|
| 0430304 | 6/1991 | European Pat. Off. | 95/52 |
| 03-143523 | 6/1991 | Japan | 95/52 |

*Primary Examiner*—Robert Spitzer
*Attorney, Agent, or Firm*—Chernoff, Vilhauer, McClung & Stenzel, LLP

[57] ABSTRACT

Membrane-based vapor permeation system for selective removal of a vapor from a fluid feed stream, wherein a countercurrent sweep stream is used that has a particular partial pressure of the vapor to be removed.

19 Claims, 5 Drawing Sheets

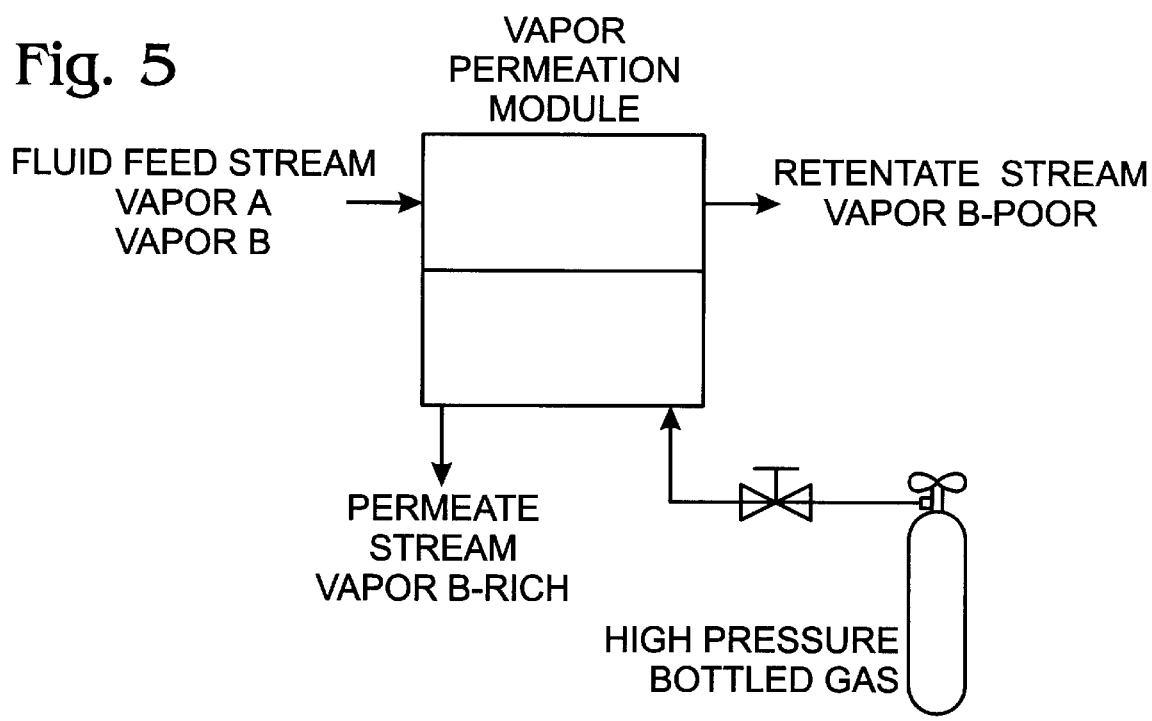
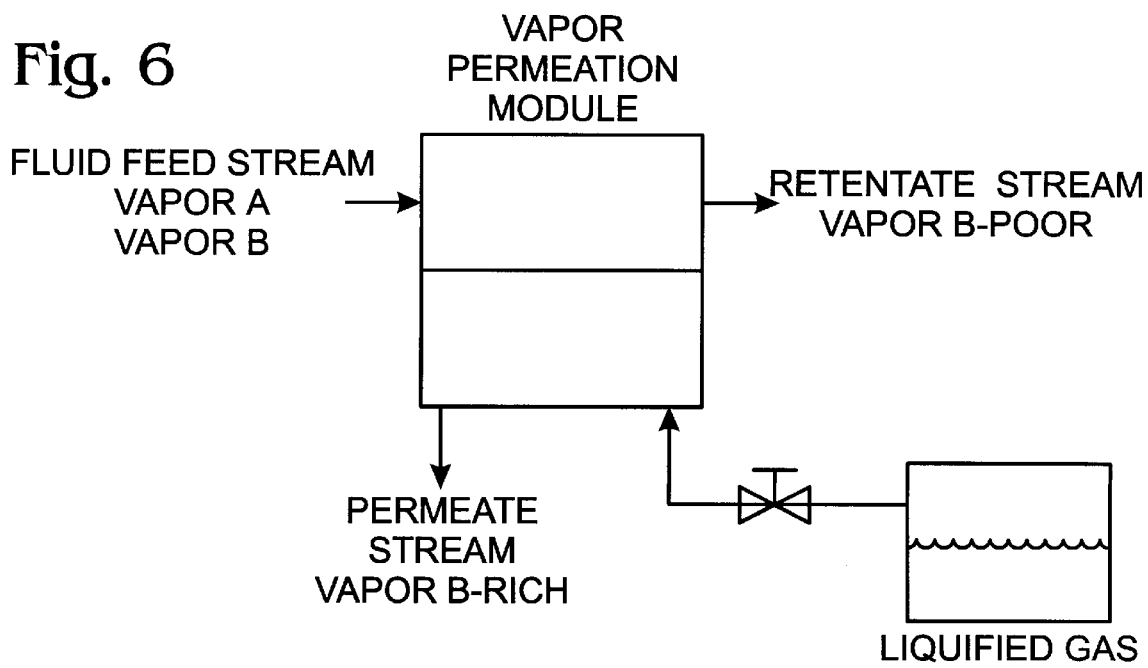

VAPOR PERMEATION SYSTEM

BACKGROUND OF THE INVENTION

Vapor permeation is a membrane-based process that can be used to separate mixtures of vapors. In an example of such a process, a vaporous mixture of Vapor A and Vapor B is fed to the feed side of a membrane, while a vacuum pump or gaseous sweep stream, usually in combination with a condenser, maintains a sufficiently low partial pressure of Vapor B on the permeate side of the membrane to provide a chemical potential gradient of Vapor B across the membrane. Principally Vapor B, and some Vapor A, are transported to the permeate side of the membrane to form a vapor-phase permeate.

Key to the development of a low-cost, efficient vapor-permeation process is the method used to maintain a low partial pressure of Vapor B on the permeate side of the membrane. The prior art describes the application of a vacuum to the permeate side of the membrane, reducing the total pressure of the permeate, thereby reducing the partial pressure of Vapor B on the membrane's permeate side. However, in many instances the cost and complexity of a vacuum system makes this impractical. Furthermore, vacuum-driven systems often leak, allowing air to enter the system. For many separations, especially those with oxygen-sensitive compounds or highly flammable compounds, the presence of oxygen is undesirable or dangerous. Thus, alternative methods are desirable.

U.S. Pat. No. 4,978,430 discloses a vapor permeation process for dehydrating and concentrating an aqueous solution containing an organic compound, whereby the permeate is kept under reduced pressure or a "dry inert gas" can be used to reduce the partial pressure.

U.S. Pat. No. 5,226,932 discloses a membrane process for drying noncondensable gases such as air, nitrogen, carbon dioxide or ammonia that uses low vacuum levels and a dry countercurrent sweep gas on the permeate side of the membrane. Commonly-owned U.S. Pat. No. 5,108,464 also discloses a membrane process for drying noncondensable gases such as air, lower hydrocarbons and acid gases using a countercurrent sweep gas, wherein the sweep gas may be introduced to the permeate side of a hollow fiber membrane module at the retentate end, such that it mixes with the permeate as it passes along the membrane and then exits at the feed end of the module.

U.S. Pat. No. 5,034,025 discloses a membrane process for drying water vapor-containing noncondensable gases such as air, carbon dioxide or natural gas that includes maintaining a water vapor partial pressure differential across the membrane, contacting the lower pressure and permeate side of the membrane with a dry organic condensable sweep gas that is immiscible with water, preferably in a countercurrent flow mode, collecting and condensing the sweep gas containing permeated water, thereby forming a two-phase organic-aqueous liquid condensate, then separating the organic and aqueous phases.

As is apparent from the foregoing, the prior art has suggested the use of a countercurrent gaseous sweep stream on the permeate side of the separation membrane. However, no guidelines have been suggested as to what properties this sweep gas should have. It has been discovered that, in order for the use of a counter-current gaseous sweep stream on the permeate side to be practical, it must have a low concentration or a low partial pressure of Vapor B on the permeate side of the membrane. Furthermore, the method of generating gaseous sweep containing the low concentration of Vapor B must be carefully selected so as to maintain a high-performance, efficient, low-cost system.

SUMMARY OF THE INVENTION

The present invention comprises a vapor permeation process for the selective removal of a first vapor from a feed stream containing a mixture of vapors, comprising the steps:

(a) providing a membrane having feed and permeate sides;

(b) directing the feed stream to the feed side of the membrane and withdrawing a retentate stream depleted in the first vapor from the feed side of the membrane and withdrawing a permeate stream enriched in the first vapor from the permeate side of the membrane; and (c) directing a gas phase sweep stream to the permeate side of the membrane, the sweep stream flowing countercurrent to the flow of the feed stream, wherein the partial pressure of the first vapor in the sweep stream is sufficiently low that the ratio of the partial pressure of the first vapor in the sweep stream to the partial pressure of the first vapor in the retentate stream is less than 0.9.

A closely related aspect of the invention is the method used to generate the sweep stream. The invention includes methods selected from membrane separation, sorption, condensation, bottled purified gases, and gas produced by evaporation of a liquified gas.

Another closely related aspect of the invention is the use of a vapor-removal process on the permeate stream that is enriched in the first vapor. The vapor-removal process is selected from condensation, sorption, and a membrane separation. The vapor-removal process can also be used to produce a depleted gas-phase stream that can be recycled back to the vapor permeation process, being introduced as sweep gas in step (c).

BRIEF DESCRIPTION OF THE SEVERAL VIEWS OF THE DRAWINGS

FIGS. 1–10 are schematics showing alternative embodiments of the invention.

DETAILED DESCRIPTION OF THE INVENTION

For purposes of the present invention, the following definitions are used.

Vapors: fluids in the gas phase below their critical temperatures and having a boiling point of greater than −100° C.

Sweep: a gas phase fluid, i.e., not a liquid at operating conditions of the process; may be a vapor, as long as it has a low concentration or partial pressure of Vapor B.

Vapor B-rich permeate: the partial pressure of Vapor B in the permeate stream divided by the sum of the partial pressure of Vapor B and the partial pressure of Vapor A in the permeate stream is greater than the same ratio in the feed stream. This term does not necessarily mean that the partial pressure of Vapor B in the permeate is greater than the partial pressure of Vapor B in the feed, since the permeate also contains the gas phase sweep gas.

For illustrative purposes, it is assumed that the feed stream contains two vapors: Vapor A and Vapor B. It is further assumed that the membrane is more permeable to Vapor B than to Vapor A.

Figure 1:
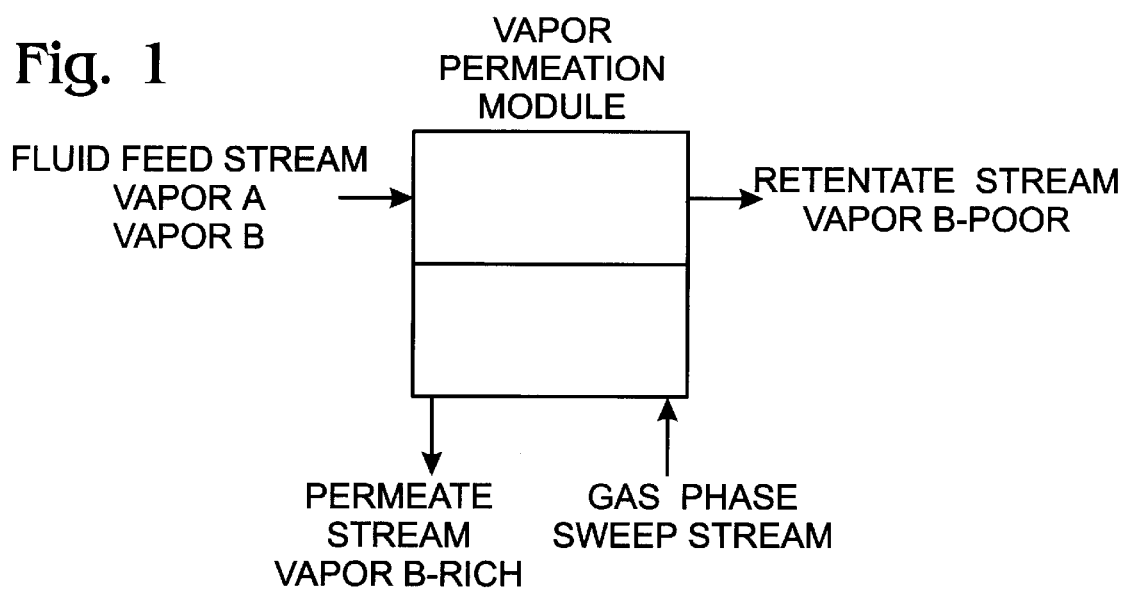

FIG. 1 shows the basic process using a membrane to produce a Vapor B-rich permeate stream and a Vapor B-depleted retentate stream, using a countercurrent sweep stream to maintain a low partial pressure of Vapor B on the permeate side of the membrane.

Figure 2:
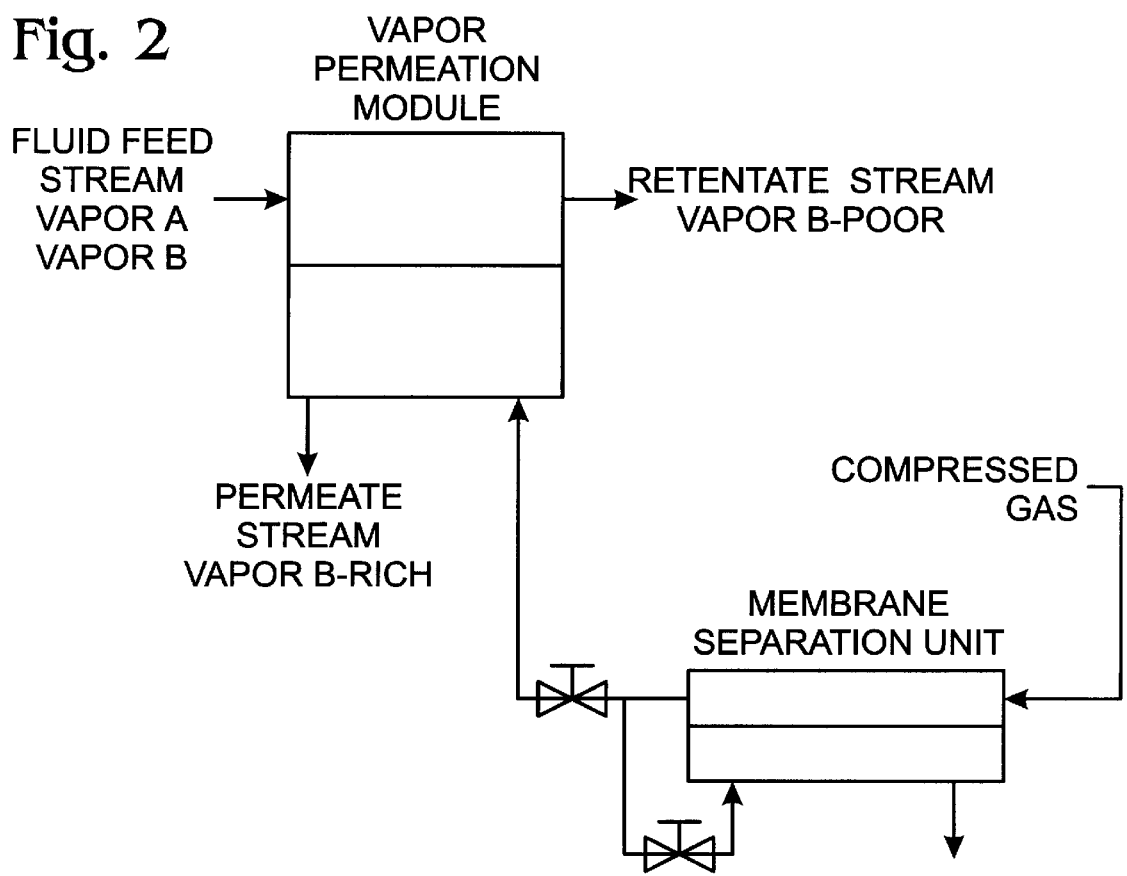

FIG. 2 shows a process similar to that shown in FIG. 1 except that the sweep stream is produced by a membrane-based unit.

Figure 3:
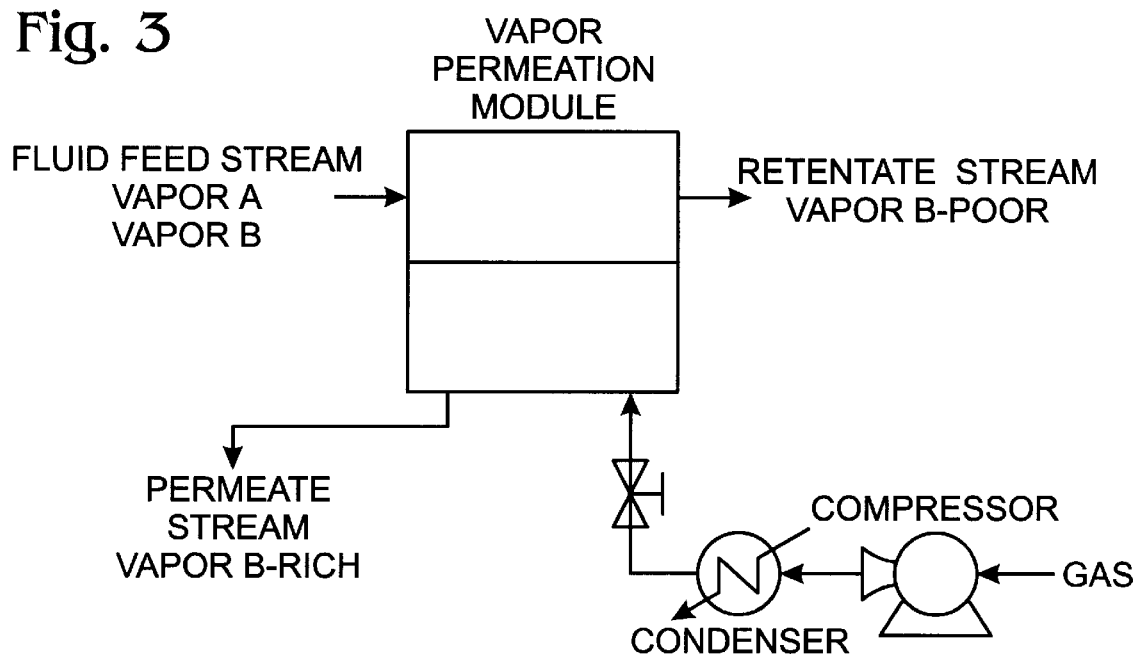

FIG. 3 shows a process similar to that shown in FIG. 1 except that the sweep stream is produced by a hydrid compression/condensation process.

Figure 4:
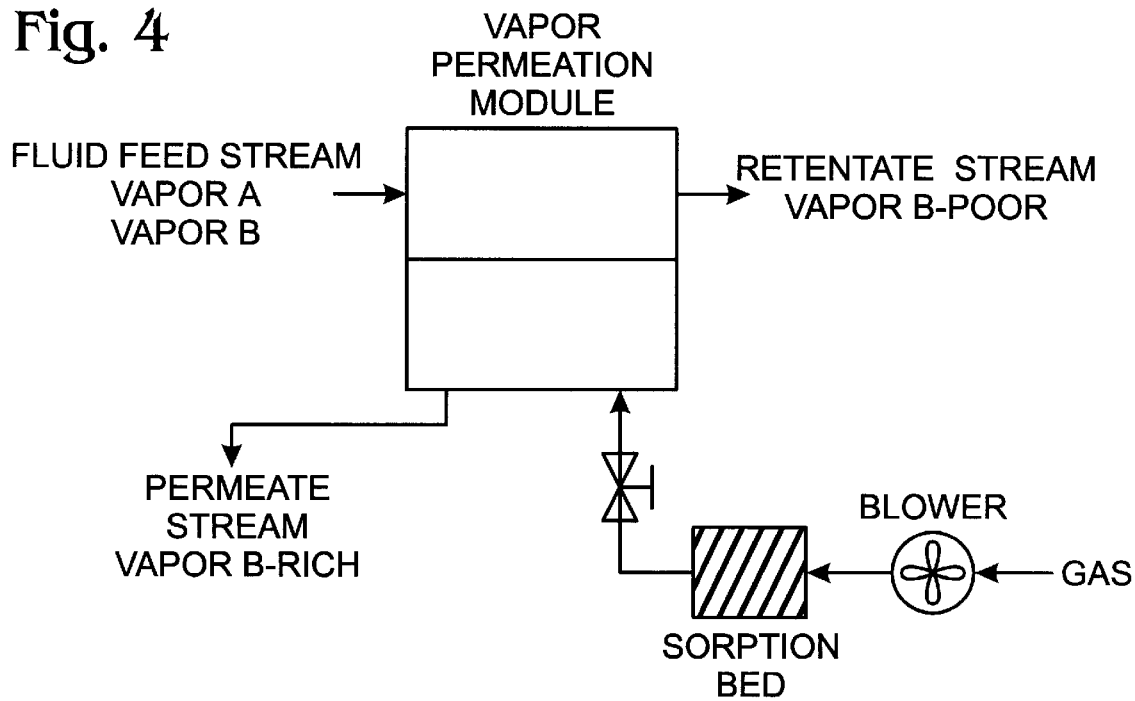

FIG. 4 shows a process similar to that shown in FIG. 1 except that the sweep stream is produced by a sorption process.

FIG. 5 shows a process similar to that shown in FIG. 1 except that the sweep stream is obtained from bottled purified gas.

FIG. 6 shows a process similar to that shown in FIG. 1 except that the sweep stream is produced by evaporation of a liquified gas.

Figure 7:
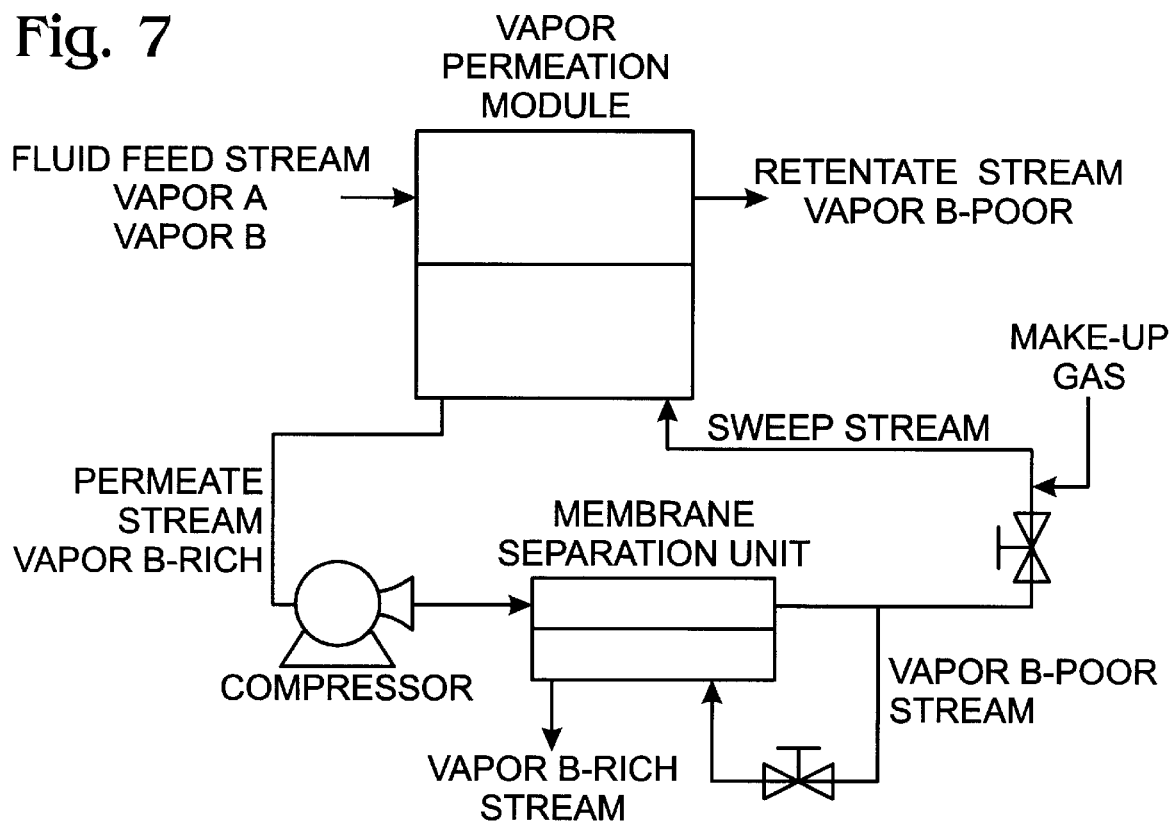

FIG. 7 shows a process similar to that shown in FIG. 1 except that the sweep stream is produced by directing the Vapor B-rich permeate stream to a second membrane-based process, producing a Vapor B-depleted retentate stream that is used as the sweep stream, thereby recycling the gas used for the sweep stream. A makeup gas stream is used to offset any gas losses from the second membrane.

Figure 8:
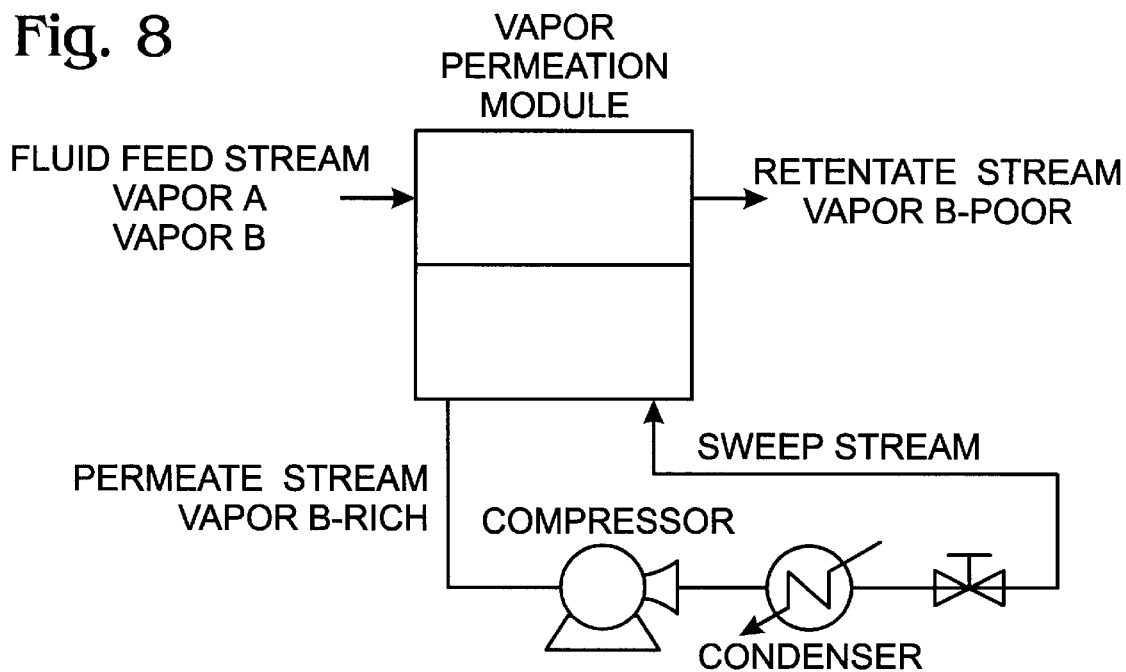

FIG. 8 shows a process similar to that shown in FIG. 1 except that the sweep stream is produced by directing the Vapor B-rich permeate stream to a compression/condensation process, which produces a Vapor B-depleted non-condensable stream that is used as the sweep stream, thereby recycling the gas used for the sweep stream.

Figure 9:
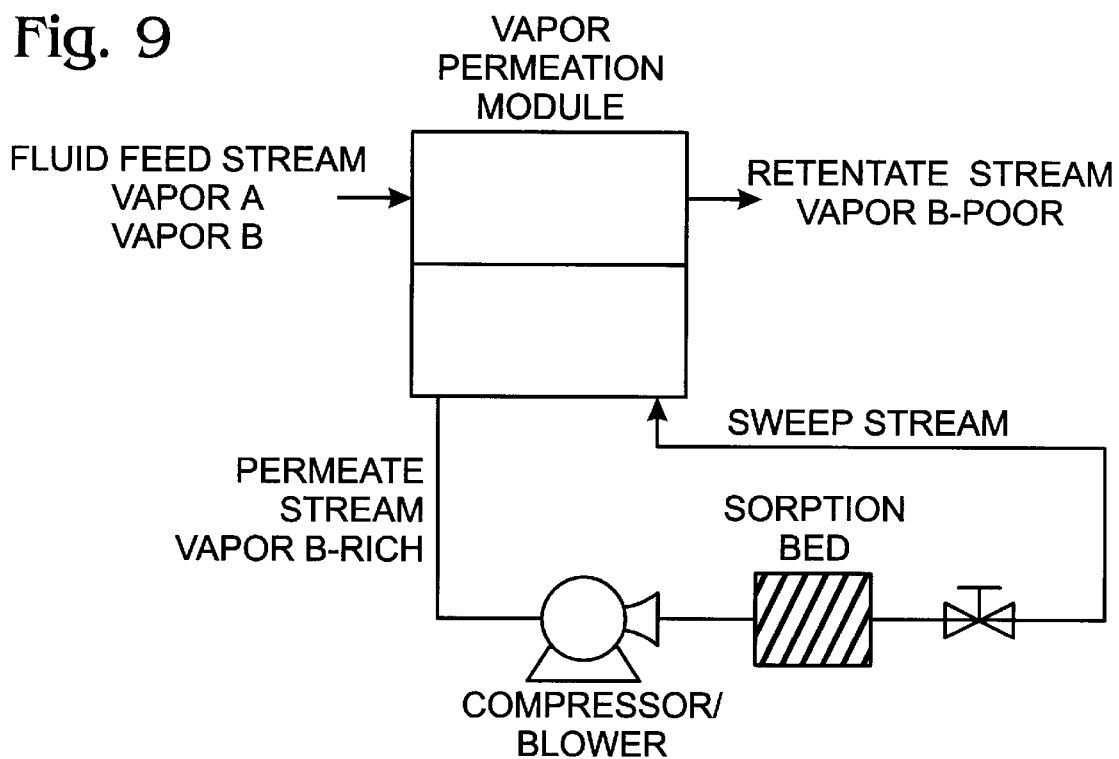

FIG. 9 shows a process similar to that shown in FIG. 1 except that the sweep stream is produced by directing the Vapor B-rich permeate stream to a sorption process, which produces a Vapor B-depleted stream that is used as the sweep stream, thereby recycling the gas used for the sweep stream.

Figure 10:
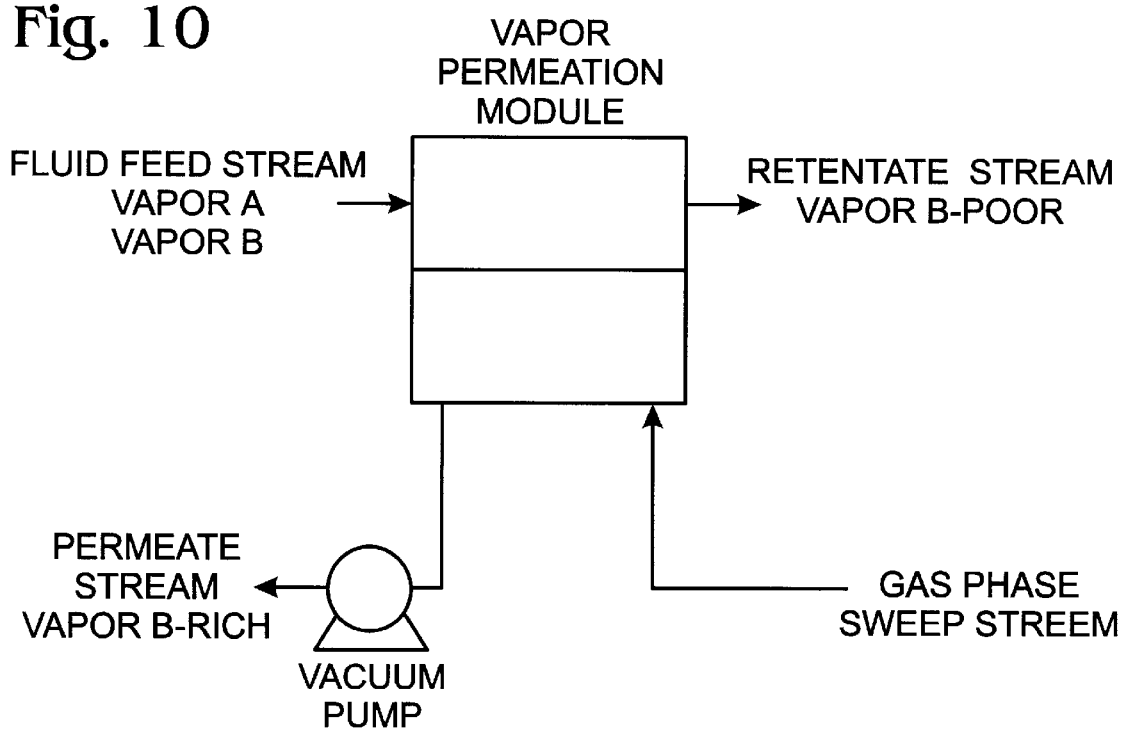

FIG. 10 shows a process similar to that shown in FIG. 1 except that the sweep stream is a gas and a vacuum pump is used on the vapor B-rich permeate streams to enhance efficiency.

It has been discovered that for the use of a countercurrent sweep stream to be effective in vapor removal, the ratio of the partial pressure of the more permeable vapor in the sweep to that of the same component in the retentate must be less than 0.9, preferably less than 0.5. If this partial pressure ratio is greater than 0.9, the driving force for transport of the vapor from the feed side of the membrane to the permeate/sweep stream becomes unacceptably low, which in turn leads to low feed-flow rates to achieve a given level of purity of the retentate stream. Low feed-flow rates mean higher system costs due to the increased membrane area required to treat a given feed-flow rate. However, when the permeant's partial pressure ratio is less than 0.9, the driving force is sufficiently high to permit reasonable feed-flow rates to be used to obtain acceptably high retentate purity, leading to efficient, low-cost systems.

The temperature of the feed should be greater than its condensation temperature at one atmosphere, which in turn should be greater than ambient temperature, and most preferably greater than 40° C., while the total feed pressure should be greater than ambient pressure, and preferably less than 10 atm.

The separation to be achieved by the vapor permeation process of the present invention is most preferably the removal of water vapor from organic vapors, but may also be applied to the removal of volatile compounds from water, or the separation of organic and inorganic vapor mixtures. Generally, the membrane used is selected so that the minor component of the feed stream is selectively removed by the membrane; however, the invention need not be so limited.

The volumetric flow of the sweep stream at the sweep inlet port may be adjusted to provide the desired efficiency. Preferably, the volumetric flow of the sweep stream is sufficient to reduce the partial pressure of the more permeable component on the permeate side of the membrane at the retentate end of the module to below about 90% or less than the value on the feed side of the membrane at the retentate end of the module. The amount of sweep used will therefore depend on the operating conditions and desired concentration of the more permeable component in the retentate stream. Generally, the volumetric flow of the sweep stream should be at least 0.5% of the volumetric flow of the combined permeate-side mixture. In cases where the desired concentration in the retentate stream is very low and the membrane selectivity is high, the volumetric flow of the sweep stream can be 99% or more of the volumetric flow of the combined permeate-side mixture.

The sweep stream used may be any gas or condensable vapor that contains a low concentration of the vapor to be removed from the feed stream. For example, in applications where the inert gas nitrogen is used to blanket a flammable solvent, the nitrogen can be used as the sweep stream. Other examples of fluids that can be used as the sweep stream include the inert gases argon and helium; hydrogen; air; steam; carbon dioxide; and carbon monoxide.

The vaporous mixture comprising the feed stream to the membrane selected for the vapor permeation process may derive from a variety of sources including, but not limited to, industrial process vent streams, the vaporous overhead from a distillation process, the overhead from a reflux process, vaporized liquids from industrial processes, vaporized industrial process vent streams, chemical process liquids, the production of fine chemicals, production of pharmaceuticals, the recovery or purification of flavors and fragrances from natural products, and fermentation processes.

The vapors that comprise the vaporous feed mixture can be virtually any compounds with sufficient volatility to be present in the vapor phase. Generally, this includes compounds with boiling points that are less than about 200° C. at one atmosphere, preferably greater than ambient but less than 180° C., and most preferably greater than 40° C. but less than 150° C. Examples of compounds that can be removed from the vaporous feed mixture by the process of the present invention include, but are not limited to, water, chlorofluorocarbons such as Freons and Halons; chlorinated hydrocarbons, such as methylene chloride, trichloroethylene, trichloroethanes, carbon tetrachloride, and chlorobenzene; nonchlorinated hydrophobic organics, such as benzene, toluene, xylene, ethyl benzene, cyclohexane, hexane, and octane; nonchlorinated hydrophilic organics, such as methanol, ethanol, isopropyl alcohol, and other alcohols; acetone, ethyl acetate, methyl ethyl ketone, methyl t-butyl ketone, and other ketones; nitrobenzene; phenols and cresols; formic acid, acetic acid, and other organic acids; amines, including triethylamine and pyridine; acetonitrile; dimethyl formamide, dimethylacetamide, and N-methylpyrrolidinone; and volatile inorganic compounds such as ammonia, bromine, iodine, sulfur dioxide, and thionyl chloride.

The types of membranes suitable for use in the present invention may be broadly described as separation membranes that are used for their selectively permeable nature, and more specifically those which are relatively permeable to one vapor relative to other vapors in the feed stream, and which are "non-reactive" with the vapors of interest in the sense of not contributing to or causing any chemical reaction or conversion of the vapor desired to be removed. The membrane can be made entirely of the permselective material or the permselective material may be supported on a porous membrane, fabric or screen. Examples of such permselective materials useful for such separations include, but are not limited to, hydrophilic materials, including polyvinyl alcohol, cellulosic materials, chitin and derivatives thereof; polyurethanes, polyamides, polyamines, poly(acrylic acids), poly(acrylates), poly(vinyl acetates), and polyethers; hydrophobic materials such as natural rubber, nitrile rubber, polystyrene-butadiene copolymers, poly (butadieneacrylonitrile) rubber; polyurethanes; polyamides; polyacetylenes; poly(trimethylsilylpropyne); fluoroelastomers; poly(vinylchlorides); poly(phosphazenes), particularly those with organic substituents; halogenated polymers, such as poly(vinylidene fluoride) and poly (tetrafluoroethylene); and polysiloxanes, including silicone rubber. Ionexchange membranes may also be used for some applications. Blends, copolymers, and crosslinked versions of these materials are also useful. Crosslinking of polymers is preferred in most cases to provide sufficient resistance to swelling or dissolution by components of the feed stream.

The membrane may be isotropic or asymmetric. Additionally, the membrane may be homogeneous or a multi-layer composite. In most cases, it is preferred that the membrane material be crosslinked to provide sufficient resistance to swelling or dissolution by the components in the feed stream. The membrane may be made by a solvent phase-inversion process, thermally induced phase-inversion process, melt-extrusion process, or by a wet or dry solvent-casting process. In the case of multilayer composites, the selective layer can be formed by dip-coating, painting, spray-coating, solution-coating, or by interfacial polymerization.

In multilayer composites, the support layers that provide mechanical strength to the composite (as opposed to the permselective layer) should give as little resistance to the transport of the permeating species through the selective layer as is technically feasible. Additionally, the support membrane should be chemically and thermally resistant, allowing for operation on hot feed streams containing various chemical constituents. Materials suitable for the support membrane include, but are not limited to, organic polymers such as polypropylene, polyacrylonitrile, poly (vinylidenefluorides), poly(etherimides), polyimides, polysulfones, poly(ethersulfones), poly(arylsulfones), poly (phenylquinoxalines), polybenzimidazoles, and copolymers and blends of these materials; and inorganic materials such as porous glass, carbon, ceramics, and metals.

The membrane can be used in the form of a flat sheet or hollow fiber or tube. For flat-sheet membranes, the membrane may be placed into a plate-and-frame module designed to permit countercurrent flow of the permeate stream relative to the feed stream. Spiral-wound modules are not suitable inasmuch as they do not allow for countercurrent flow. For hollow fibers and tubes, the feed flow may be on the outside (shell side) or inside (tube side) of the fibers. Especially preferred is a tube-side-feed hollow fiber membrane module. The materials used in the membrane module should have sufficient chemical and thermal resistance to permit long-term operation.

EXAMPLE 1

Utilizing a system of substantially the same configuration as shown in FIG. 2, a vaporous feed solution comprising 4.8 wt % water in isopropyl alcohol (IPA) at a pressure of 0.1 bar (gage) and a temperature of 95° C. was fed at a rate of 7.8 kg/hr to the lumens of hollow fiber membranes in a module having an effective membrane area of 2.8 m². The inside surfaces of the hollow fibers were coated with a selective layer of a hydrophilic crosslinked polyamide blended with polyvinyl alcohol.

A sweep stream comprising dry air at 95° C. and having a dew point of −29° C. at 6.9 bar (gage) was generated by passing compressed air at 6.9 bar (gage) through an air dehydration module (ADU) manufactured by AquaAir, Inc. of Bend, Oreg. The pressure of this sweep stream was reduced to ambient using a throttle valve and introduced to the permeate side of the membrane at an inlet port located near the retentate end of the module so as to flow substantially countercurrent to the flow of the feed at 280 L (STP)/min.

Under the operating conditions described, the retentate stream had a water partial pressure of 0.00338 bar (absolute), while the sweep stream inlet had a water partial pressure of 0.0005 bar (absolute), so that the ratio of water partial pressure in the sweep stream to water partial pressure in the retentate stream was 0.015. This yielded a retentate stream water concentration of 0.1 wt %, corresponding to a water removal rate of 97.9%.

EXAMPLE 2

Utilizing a system of substantially the same configuration as shown in FIG. 5, a vaporous feed solution comprising 5.9 wt % water in IPA at a pressure of 0.05 bar (gage) and a temperature of 90° C. was fed at a rate of 4.4 kg/hr to the lumens of hollow fiber membranes in a module having an effective membrane area of 2.8 m². The inside surfaces of the hollow fibers were coated with a selective layer of the crosslinked hydrophilic polymer of Example 1.

A sweep stream comprising nitrogen from a gas cylinder at essentially ambient pressure and 90° C. was introduced to the permeate side of the membrane at an inlet port located near the retentate end of the module so as to flow substantially countercurrent to the flow of the feed at 136 L (STP)/min.

Under these operating conditions the retentate stream had a water partial pressure of 0.00048 bar (absolute), while the sweep stream inlet had a water partial pressure of 0.00002 bar (absolute), so that the ratio of water partial pressure in the sweep stream to water partial pressure in the retentate stream was 0.032. This yielded a retentate stream water concentration of 0.01 wt %, corresponding to a water removal rate of 99.8%.

EXAMPLE 3

Utilizing a system of substantially the same configuration as shown in FIG. 10, a vaporous feed solution comprising 7.6 wt % water in IPA at a pressure of 0.3 bar (gage) and a temperature of 91° C. was fed at a rate of 8.5 kg/hr to the lumens of hollow fiber membranes in a module having an effective membrane area of 2.8 m². The inside surfaces of the hollow fibers were coated with a selective layer of the crosslinked hydrophilic polymer of Example 1.

A sweep stream comprising dry air at 91° C. and 0.3 bar (absolute) and a dew point of −30° C. at 6.9 bar (gage) was generated by passing compressed air at 6.9 bar (gage) through the same ADU module used in Example 1. The dry air sweep stream produced by this module was introduced to the permeate side of the membrane at an inlet port located near the retentate end of the module so as to flow substantially countercurrent to the flow of the feed at 127 L (STP)/min. A vacuum pump was used to reduce the pressure of the permeate stream to 0.3 bar (absolute).

Under such conditions, the retentate stream had a water partial pressure of 0.00203 bar (absolute), while the sweep stream inlet had a water partial pressure of 0.00005 bar (absolute), so that the ratio of water partial pressure in the sweep stream to water partial pressure in the retentate stream was 0.024. This yielded a retentate stream water concentration of 0.1 wt %, corresponding to a water removal rate of 99.2%.

EXAMPLE 4

Example 3 was substantially repeated with the following exceptions: the vaporous feed solution contained 9.4 wt % water at a pressure of 0.1 bar (gage) and was fed at a rate of 6.0 kg/hr to the hollow fiber membrane module; the sweep stream was nitrogen from a gas cylinder at 91° C. and 0.3 bar (absolute) flowing at 57 L (STP)/min.

Under these conditions, the retentate stream had a water partial pressure of 0.00008 bar (absolute), while the sweep stream inlet had a water partial pressure of 0.00002 bar (absolute), so that the ratio of water partial pressure in the sweep stream to water partial pressure in the retentate stream was 0.2. This yielded a retentate stream water concentration of 0.002 wt %, corresponding to a water removal rate of 99.9%.

EXAMPLE 5

Utilizing a system of substantially the same configuration as shown in FIG. 10, a vaporous feed solution comprising 3.3 wt % water in ethyl acetate at a pressure of 0.3 bar (gage) and a temperature of 95° C. was fed at a rate of 0.14 kg/hr to the lumens of hollow fiber membranes in a module having an effective membrane area of 232 $cm^2$. The inside surfaces of the hollow fibers were coated with a selective layer as in Example 1.

A sweep stream comprising nitrogen from a gas cylinder at 95° C. and 0.3 bar (absolute) was introduced to the permeate side of the membrane at an inlet port located near the retentate end of the module so as to flow substantially countercurrent to the flow of the feed at 0.6 L (STP)/min. A vacuum pump was used to reduce the pressure of the permeate stream to 0.3 bar (absolute).

Under such operating conditions, the retentate stream had a water partial pressure of 0.01524 bar (absolute), while the sweep stream inlet had a water partial pressure of 0.00002 bar (absolute), so that the ratio of water partial pressure in the sweep stream to water partial pressure in the retentate stream was 0.001. This yielded a retentate stream water concentration of 0.1 wt %, corresponding to a water removal rate of 89.9%.

EXAMPLE 6

Utilizing a system of substantially the same configuration as shown in FIG. 10, a vaporous feed solution comprising 12.2 wt % water in ethanol at a pressure of 0.2 bar (gage) and a temperature of 91° C. was fed at a rate of 0.07 kg/hr to the lumens of hollow fiber membranes in a module having an effective membrane area of 232 $cm^2$. The inside surfaces of the hollow fibers were coated with a selective layer as in Example 1.

A sweep stream comprising nitrogen from a gas cylinder at 91° C. and 0.3 bar (absolute) was introduced to the permeate side of the membrane at an inlet port located near the retentate end of the module so as to flow substantially countercurrent to the flow of the feed at 0.6 L (STP)/min. A vacuum pump was used to reduce the pressure of the permeate stream to 0.3 bar (absolute).

Under the operating conditions described, the retentate stream had a water partial pressure of 0.00460 bar (absolute), while the sweep stream inlet had a water partial pressure of 0.00002 bar (absolute), so that the ratio of water partial pressure in the sweep stream to water partial pressure in the retentate stream was 0.003. This yielded a retentate stream water concentration of 0.2 wt %, corresponding to a water removal rate of 98.7%.

EXAMPLE 7

Utilizing a system of substantially the same configuration as shown in FIG. 10, a vaporous feed solution comprising 7.5 wt % water in tetrahydrofuran at a pressure of 0.1 bar (gage) and a temperature of 80° C. was fed at a rate of 1.8 kg/hr to the lumens of hollow fiber membranes in a module having an effective membrane area of 1.4 $m^2$. The inside surfaces of the hollow fibers were coated with a selective layer as in Example 1.

A sweep stream comprising nitrogen from a gas cylinder at 80° C. and 0.3 bar (absolute) was introduced to the permeate side of the membrane at an inlet port located near the retentate end of the module so as to flow substantially countercurrent to the flow of the feed at 85 L (STP)/min. A vacuum pump was used to reduce the pressure of the permeate stream to 0.3 bar (absolute).

Under the operating conditions described, the retentate stream had a water partial pressure of 0.00686 bar (absolute), while the sweep stream inlet had a water partial pressure of 0.00002 bar (absolute), so that the ratio of water partial pressure in the sweep stream to water partial pressure in the retentate stream was 0.002. This yielded a retentate stream water concentration of 0.01 wt %, corresponding to a water removal rate of 99.9%.

EXAMPLE 8

Example 3 was substantially repeated with the following exceptions: the vaporous feed solution contained 12.7 wt % water at a pressure of 0.1 bar (gage) and a temperature of 95° C.; the sweep stream was nitrogen from a gas cylinder at 95° C. and 0.3 bar (absolute) and flowed at 57 L (STP)/min.

Under such operating conditions, the retentate stream had a water partial pressure of 0.00047 bar (absolute), while the sweep stream inlet had a water partial pressure of 0.00002 bar (absolute), so that the ratio of water partial pressure in the sweep stream to water partial pressure in the retentate stream was 0.032. This yielded a retentate stream water concentration of 0.014 wt %, corresponding to a water removal rate of 99.9%.

COMPARATIVE EXAMPLE 1

For comparison, the system and module described in Example 8 were operated under identical operating conditions with countercurrent permeate flow but with the nitrogen sweep flow set to zero so that no nitrogen was introduced as a sweep gas to the membrane module. Under these conditions, the retentate stream had a water concentration of 5.2 wt %, corresponding to a water removal rate of only 60%.

EXAMPLE 9

A computerized mathematical model of the system shown in FIG. 8 was prepared and utilized to predict the performance of the system utilizing various parameters. A vaporous feed solution comprising 18 wt % water in IPA at a pressure of 0.1 bar (gage) and a temperature of 95° C. is fed at a rate of 8.9 kg/hr to the lumens of hollow fiber membrane in a module having an effective membrane area of 2.8 m², the inside surfaces of the hollow fibers of which are coated with the same type of selective layer as used in previous Examples.

A sweep stream of nitrogen at 95° C. and at essentially ambient pressure and having a water vapor partial pressure of 0.0007 bar (absolute) is introduced to the permeate side of the membrane at an inlet port located near the retentate end of the module so as to flow substantially countercurrent to the flow of the feed at 516 L (STP)/min.

Under these conditions, the permeate exiting the module has a calculated water vapor partial pressure of 0.047 bar (absolute). This stream is fed to a compressor, where the pressure is increased to 6.9 bar (gage). The resulting high pressure stream is sent to a condenser operating at a temperature of 0° C., where the water vapor is condensed. The non-condensable stream exiting the condenser is reduced to essentially ambient pressure using a throttle valve. The resulting ambient pressure stream is assumed to have a water vapor partial pressure of 0.0005 bar (absolute). The stream is then heated to 95° C. and introduced into the module as a countercurrent sweep stream.

Under such operating conditions, the retentate stream has a calculated water concentration of 0.05 wt %, corresponding to a water vapor partial pressure of 0.00014 bar (absolute). Thus, the module has a calculated water removal rate of 99.7% and the ratio of the water vapor partial pressure in the sweep stream to that of the retentate stream is calculated to be 0.36.

EXAMPLE 10

A computerized mathematical model of the system shown in FIG. 7 was prepared and utilized to predict the performance of the system utilizing various parameters. The same vaporous feed solution as in Example 9 is fed in the same manner and at the same rate to the same hypothetical hollow fiber membrane module and using the same sweep stream of Example 9, to produce a permeate exiting the module having a calculated water vapor partial pressure of 0.047 bar (absolute). This stream is fed to a compressor, where the pressure is increased to 6.9 bar (gage). The resulting high pressure stream is calculated to have a dew point temperature (at 6.9 bar (gage)) of 74° C. This stream is then directed to a membrane gas-drying module to reduce the dew point of the gas to 0° C. (at 6.9 bar (gage). The pressure of this stream is then reduced to essentially ambient pressure using a throttle valve and make-up nitrogen from a gas cylinder at a flow rate of 103 L (STP)/min is blended with this stream. The blended stream, which has a calculated water vapor partial pressure of 0.0005 bar (absolute), is then heated to 95° C. and introduced into the module as a sweep stream.

Under such operating conditions, the retentate stream has a calculated water concentration of 0.05 wt %, corresponding to a water vapor partial pressure of 0.00014 bar (absolute). Thus, the module has a water removal rate of 99.7% and the ratio of the water vapor partial pressure in the sweep stream to that of the retentate stream is 0.36.

EXAMPLE 11

A computerized mathematical model of the system shown in FIG. 9 was prepared and utilized to predict the performance of the system utilizing various parameters. The same vaporous feed solution is fed in the same manner and at the same rate to the same module and using the same sweep stream of Example 9, to produce a permeate exiting the module having a calculated water vapor partial pressure of 0.047 bar (absolute). This stream is fed to a compressor, where the pressure is increased to 6.9 bar (gage). The resulting high pressure stream is sent to a desiccant bed where water is removed to a pressure dew point of 0° C. The pressure of the desiccantdried nitrogen is then reduced to essentially ambient pressure using a throttle valve. The resulting ambient pressure stream has a calculated water vapor partial pressure of 0.0005 bar (absolute). The stream is then heated to 95° C. and introduced into the module as a sweep stream.

Under such operating conditions, the retentate stream had a calculated water concentration of 0.05 wt %, corresponding to a water vapor partial pressure of 0.00014 bar (absolute). Thus, the module has a calculated water removal rate of 99.7% and the ratio of the water vapor partial pressure in the sweep stream to that of the retentate stream is 0.36.

EXAMPLES 12 TO 17

A computerized mathematical model of the system shown in FIG. 10 was prepared and utilized to predict the performance of the system utilizing various parameters. A vaporous feed solution comprising 10 wt % water in IPA at a pressure of 0.1 bar (gage) and a temperature of 95° C. is fed to the lumens of hollow fiber membranes in a module having an effective membrane area of 2.8 m², the inside surfaces of the hollow fibers of which are coated with the same type of selective layer as in previous Examples. The flow rate of this feed stream was varied as shown in Table 1 and as discussed below.

A sweep stream of nitrogen at 95° C. and at a pressure of 0.2 bar (absolute) and having the various water vapor partial pressures shown in Table 1 is introduced to the permeate side of the membrane at an inlet port located near the retentate end of the module so as to flow substantially countercurrent to the flow of the feed at 57 L (STP)/min.

The flow rate of the vaporous feed solution was varied as shown in Table 1 so that under the specified operating conditions, the retentate stream had a water partial pressure of 0.0039 bar (absolute), corresponding to a retentate stream water concentration of 0.1 wt % water, corresponding to a water removal rate of 99%. The results in Table 1 show that when the ratio of water partial pressure in the sweep stream to water partial pressure in the retentate stream is greater than about 0.9, the feed flow rate to the module must be very low to obtain the desired retentate water concentration, resulting in a high-cost and inefficient system. The reason that the feed flow rate to the module must be very low to obtain the desired retentate water concentration is because when the ratio is greater than 0.9, the partial-pressure driving force for transport of water vapor across the membrane also becomes low. Therefore, to achieve a given retentate water concentration, the flow rate of feed solution to the module must be reduced to allow sufficient time for water to be removed from the feed solution. The reason that a >0.9 ratio results in a high-cost and inefficient system is because when the ratio is greater than 0.9, the feed flow rate to the module must be low compared with when the ratio is less than 0.9. As a result, to treat a given volume of feed solution, more membrane area will be required which is less efficient, and the requirement for more membrane surface area leads to higher membrane costs, and ultimately to a higher-cost system.

TABLE 1

| Example | Water Vapor Partial Pressure (bar [absolute]) | | Ratio of Sweep to Retentate Partial Pressure | Feed Flow Rate (kg/hr) |
|---|---|---|---|---|
| | Sweep | Retentate | | |
| 12 | 0.0013 | 0.0039 | 0.33 | 6.8 |
| 13 | 0.0021 | 0.0039 | 0.55 | 6.4 |
| 14 | 0.0027 | 0.0039 | 0.70 | 6.0 |
| 15 | 0.0036 | 0.0039 | 0.94 | 5.0 |
| 16 | 0.0038 | 0.0039 | 0.97 | 4.6 |
| 17 | 0.0039 | 0.0039 | 1.00 | 4.2 |

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A process for the removal of a first vapor from a fluid feed stream containing a mixture of vapors, said process comprising the steps:
   (a) providing a membrane having feed and permeate sides and that is selectively permeable to said first vapor;
   (b) directing said fluid feed stream to the feed side of said membrane and withdrawing a retentate stream depleted in said first vapor and withdrawing a permeate stream enriched in said first vapor from the permeate side of said membrane; and
   (c) directing a gas-phase sweep stream to the permeate side of said membrane, said sweep stream flowing countercurrent to the flow of said fluid feed stream, wherein the partial pressure of said first vapor in said sweep stream is sufficiently low that the ratio of the partial pressure of said first vapor in said sweep stream to the partial pressure of said first vapor in said retentate stream is less than 0.9
wherein said first vapor and said mixture of vapors comprise compounds with boiling points greater than 0° C. but less than 200° C. at one atmosphere of pressure.

2. The process of claim 1 wherein said gas-phase sweep stream is generated by a process selected from membrane separation, sorption, and condensation.

3. The process of claim 1 wherein said gas-phase sweep stream is obtained from bottled, purified gases.

4. The process of claim 1 wherein said gas-phase sweep stream is obtained by evaporation of a liquid gas.

5. The process of claim 1, including the additional step (d) of directing said permeate stream enriched in said first vapor to a vapor-removal process.

6. The process of claim 1 or 2 or 3 or 4 or 5 wherein a vacuum is applied to the downstream side of said sweep stream.

7. The process of claim 5 wherein said vapor-removal process of step (d) is selected from condensation, sorption, and a membrane separation.

8. The process of claim 5 wherein said vapor-removal process of step (d) produces a depleted gas-phase stream that is depleted in said first vapor, wherein the concentration of said first vapor in said depleted gas-phase stream is sufficiently low such that the ratio of the partial pressure of said first vapor in said depleted gas-phase stream to the partial pressure of said first vapor in said retentate stream is less than 0.9.

9. The process of claim 8 wherein said depleted gas-phase stream is used as the sweep stream in step (c), thereby recycling said gas-phase sweep stream.

10. The process of claim 1 wherein said membrane is a hollow fiber composite membrane.

11. The process of claim 1 wherein said first vapor is water vapor.

12. The process of claim 1 wherein said mixture of vapors comprises water vapor and at least one organic vapor.

13. The process of claim 12 wherein said at least one organic vapor is selected from the group consisting of isopropyl alcohol, ethanol, ethyl acetate and tetrahydrofuran.

14. The process of claim 1 wherein said feed stream has a condensation temperature of greater than 40° C. at 1 atmosphere.

15. The process of claim 14 wherein the temperature of the feed stream is maintained at a temperature that is greater than or equal to the condensation temperature of the feed stream at 1 atmosphere.

16. The process of claim 1 wherein said feed stream is maintained at a pressure of greater than 0 bar (gage) and less than 10 bar (gage).

17. The process of claim 16 wherein said feed stream is maintained at a pressure of less than 4 bar (gage).

18. The process of claim 1 wherein said ratio of the partial pressure of said first vapor in said sweep stream to the partial pressure of said first vapor in said retentate stream is less than 0.5.

19. A process for the removal of water vapor from a gas-phase feed stream containing a mixture comprising water and organic vapors, wherein said organic vapors comprise predominantly organic compounds with boiling points greater than 0° C. but less than 200° C., and wherein said feed stream has a condensation temperature of greater than 40° C. at 1 atmosphere and said feed stream is maintained at a temperature greater than said condensation temperature, and wherein the pressure of said feed stream is greater than 0 bar (gage) and less than 10 bar (gage), said process comprising the steps:
   (a) providing a hollow fiber module having a feed and retentate ends and feed and retentate ports and at least two permeate ports, said hollow fiber module comprising a plurality of hollow fiber membranes arranged substantially parallel to each other and sealed into a chamber, said hollow fiber membranes comprising a selective layer on a support layer;
   (b) directing said gas-phase feed stream to the feed port of said hollow fiber module, withdrawing a retentate stream depleted in water vapor from said retentate port, and withdrawing a permeate stream enriched in water vapor from a permeate port located near the feed end of said module; and
   (c) directing a gas-phase sweep stream to a permeate port located near the retentate end of said module, said sweep stream flowing countercurrent to the flow of said gas-phase feed stream, wherein the partial pressure of water vapor in said sweep stream is sufficiently low that the ratio of the partial pressure of water vapor in said sweep stream to the partial pressure of water vapor in said retentate stream is less than 0.9.

* * * * *

UNITED STATES PATENT AND TRADEMARK OFFICE
CERTIFICATE OF CORRECTION

PATENT NO.  : 5,843,209

DATED       : December 1, 1998

INVENTOR(S) :
Ray; Newbold; Friesen; McCray

It is certified that error appears in the above-indentified patent and that said Letters Patent is hereby corrected as shown below:

Title page, item [22]: insert after "Aug. 13, 1997" the following -- based upon Provisional Appl. No. 60/024,126 filed Aug. 14, 1996 --.

Col. 5, line 22: insert a hyphen (-) between "Ion" and "exchange"

Col. 10, line 9: insert a hyphen (-) between "dessicant" and "dried"

Signed and Sealed this

Twenty-fourth Day of August, 1999

Q. TODD DICKINSON

Attest:

Attesting Officer

Acting Commissioner of Patents and Trademarks

(12) REEXAMINATION CERTIFICATE (4356th)
United States Patent
Ray et al.

(10) Number: US 5,843,209 C1
(45) Certificate Issued: May 15, 2001

(54) VAPOR PERMEATION SYSTEM

(75) Inventors: Roderick J. Ray; David D. Newbold; Dwayne T. Friesen; Scott B. McCray, all of Bend, OR (US)

(73) Assignee: Bend Research, Inc., Bend, OR (US)

Reexamination Request:
No. 90/005,604, Dec. 30, 1999

Reexamination Certificate for:
Patent No.: 5,843,209
Issued: Dec. 1, 1998
Appl. No.: 08/910,409
Filed: Aug. 13, 1997

Certificate of Correction issued Aug. 24, 1999.

(51) Int. Cl.[7] ................................................. B01D 53/22
(52) U.S. Cl. ..................................... 95/52; 95/45
(58) Field of Search ......................... 95/45, 47–55; 96/4, 8–10, 13, 14

(56) References Cited

FOREIGN PATENT DOCUMENTS

701857A1    3/1996   (EP).

5-177111    7/1993   (JP).

OTHER PUBLICATIONS

Proceedings of the 57th Annual Meeting of the Society of Chemical Engineers, Japan, Saturday, Apr. 4, 1992, K. Himoniya et al. (Ube Industries).

Brochure Ube Gas Separation System by Polyamide Membrane, Ube Industries, Ltd., Printed Apr. 1989 in Japan.

R. E. Kesting, et al "Polymeric Gas Separation Membranes", pp. 317 to 346 (1993).

Specification of Industrial Nitrogen (British Standard BS 4366, 1993).

D.N. Lapeles, Technical Terms, 2nd Edition, McGraw–Hill Book Company, pp. 342, 1094 and 1706, 1978.

*Primary Examiner*—Robert H. Spitzer

(57) ABSTRACT

Membrane-based vapor permeation system for selective removal of a vapor from a fluid feed stream, wherein a countercurrent sweep stream is used that has a particular partial pressure of the vapor to be removed.

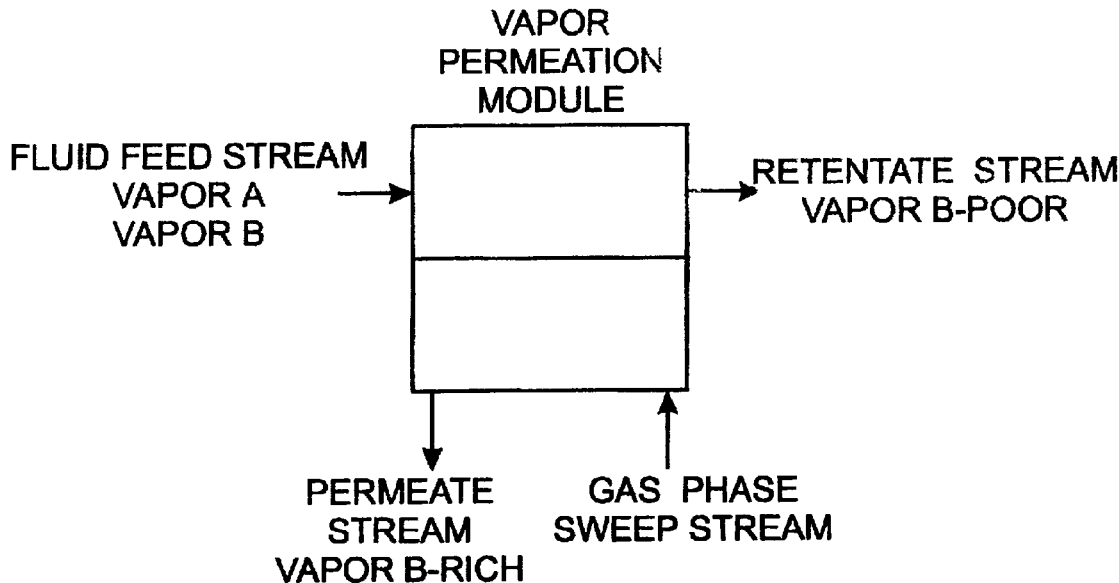

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–19 is confirmed.

* * * * *